(12) United States Patent
Cooper et al.

(10) Patent No.: US 8,330,859 B2
(45) Date of Patent: *Dec. 11, 2012

(54) METHOD, SYSTEM, AND PROGRAM PRODUCT FOR ELIMINATING ERROR CONTRIBUTION FROM PRODUCTION SWITCHERS WITH INTERNAL DVES

(75) Inventors: J. Carl Cooper, Incline Village, NV (US); Mirko Vojnovic, Santa Clara, CA (US); Maynard Grimm, Onalaska, WA (US); Christopher Smith, Simsbury, CT (US)

(73) Assignee: Pixel Instruments Corporation, Los Gatos, CA (US)

( * ) Notice: Subject to any disclaimer, the term of this patent is extended or adjusted under 35 U.S.C. 154(b) by 1329 days.

This patent is subject to a terminal disclaimer.

(21) Appl. No.: 12/036,181

(22) Filed: Feb. 22, 2008

(65) Prior Publication Data

US 2008/0180573 A1    Jul. 31, 2008

Related U.S. Application Data

(63) Continuation-in-part of application No. 12/015,460, filed on Jan. 16, 2008, now Pat. No. 7,773,152, which is a continuation-in-part of application No. 10/846,069, filed on May 14, 2004, now Pat. No. 7,333,150.

(51) Int. Cl.
*H04N 5/073* (2006.01)
*H04N 9/475* (2006.01)

(52) U.S. Cl. ........ 348/515; 348/512; 348/518; 348/578; 348/598; 348/423.1

(58) Field of Classification Search .................. 348/515, 348/512, 518, 578, 598, 425.4, 500, 513, 348/194, 423.1; 375/356, 354, 240.28; 386/61, 386/71, 75, 207, 201

See application file for complete search history.

(56) References Cited

U.S. PATENT DOCUMENTS

| | | | | |
|---|---|---|---|---|
| 5,387,943 A * | 2/1995 | Silver | ........................... | 348/512 |
| 5,572,261 A * | 11/1996 | Cooper | ........................ | 348/512 |
| 5,751,368 A * | 5/1998 | Cooper | ........................ | 348/512 |
| 6,525,780 B1 * | 2/2003 | Bruno et al. | .................. | 348/578 |
| 7,333,150 B2 * | 2/2008 | Cooper | ........................ | 348/515 |
| 7,773,152 B2 * | 8/2010 | Cooper | ........................ | 348/515 |

* cited by examiner

*Primary Examiner* — Jefferey Harold
*Assistant Examiner* — Jean W Desir
(74) *Attorney, Agent, or Firm* — David R. Stevens; Stevens Law Group

(57) ABSTRACT

Measurement of the relative timing between images and associated information, for example video and audio. Image mutual event characteristics are recognized in the images and associated mutual event characteristics are recognized in the associated information. The image mutual events and associated mutual events are compared to determine their occurrences, one relative to the other as a measure of relative timing. Particular operation with audio and video signals is described.

15 Claims, 19 Drawing Sheets

METHOD, SYSTEM, AND PROGRAM PRODUCT FOR ELIMINATING ERROR CONTRIBUTION FROM PRODUCTION SWITCHERS WITH INTERNAL DVES

CROSS REFERENCE TO RELATED APPLICATION

The present application is a continuation in part of, and claims the priority benefit of, U.S. application Ser. No. 12/015,460, filed Jan. 16, 2008, and also is a continuation in part of and claims the priority benefit of, U.S. application Ser. No. 10/846,069, filed May 14, 2004.

BACKGROUND OF INVENTION

1. Field of the Invention

The invention relates to the creation, manipulation, transmission, storage, etc. and especially synchronization of multi-media entertainment, educational and other programming having at least video and associated information.

2. Background Art

The creation, manipulation, transmission, storage, etc. of multi-media content, be it entertainment, educational, scientific, business, and other programming having at least video and associated information requires synchronization. Typical examples of such programming are television and movie programs, motion medical images, and various engineering and scientific content. These are collectively referred to as "programs."

Often these programs include a visual or video portion, an audible or audio portion, and may also include one or more various data type portions. Typical data type portions include closed captioning, narrative descriptions for the blind, additional program information data such as web sites and further information directives and various metadata included in compressed (such as for example MPEG and JPEG) systems.

Often the video and associated signal programs are produced, operated on, stored or conveyed in a manner such that the synchronization of various ones of the aforementioned audio, video and/or data is affected. For example the synchronization of audio and video, commonly known as lip sync, may be askew when the program is produced. If the program is produced with correct lip sync, that timing may be upset by subsequent operations, for example such as processing, storing or transmission of the program.

One aspect of multi-media programming is maintaining audio and video synchronization in audio-visual presentations, such as television programs, for example to prevent annoyances to the viewers, to facilitate further operations with the program or to facilitate analysis of the program. Various approaches to this challenge are described in commonly assigned, issued patents. U.S. Pat. Nos. 4,313,135, 4,665,431; 4,703,355; U.S. Pat. Re. 33,535; U.S. Pat. Nos. 5,202,761; 5,530,483; 5,550,594; 5,572,261; 5,675,388; 5,751,368; 5,920,842; 5,946,049; 6,098,046; 6,141,057 ; 6,330,033; 6,351,281; 6,392,707; 6,421,636 and 6,469,741. Generally these patents deal with detecting, maintaining and correcting lip sync and other types of video and related signal synchronization.

U.S. Pat. No. 5,572,261 describes the use of actual mouth images in the video signal to predict what syllables are being spoken and compare that information to sounds in the associated audio signal to measure the relative synchronization. Unfortunately when there are no images of the mouth, there is no ability to determine which syllables are being spoken.

As another example, in systems where the ability to measure the relation between audio and video portions of programs, an audio signal may correspond to one or more of a plurality of video signals, and it is desired to determine which. For example in a television studio where each of three speakers wears a microphone and each actor has a corresponding camera which takes images of the speaker, it is desirable to correlate the audio programming to the video signals from the cameras. One use of such correlation is to automatically select (for transmission or recording) the camera which televises the actor which is currently speaking. As another example when a particular camera is selected it is useful to select the audio corresponding to that video signal. In yet another example, it is useful to inspect an output video signal, and determine which of a group of video signals it corresponds to thereby facilitating automatic selection or timing of the corresponding audio. Commonly assigned patents describing these types of systems are described in U.S. Pat. Nos. 5,530,483 and 5,751,368.

The above patents are incorporated in their entirety herein by reference in respect to the prior art teachings they contain.

Generally, with the exception of U.S. Pat. Nos. 5,572,261, 5,530,483 and 5,751,368, the above patents describe operations without any inspection or response to the video signal images. Consequently the applicability of the descriptions of the patents is limited to particular systems where various video timing information, etc. is utilized. U.S. Pat. Nos. 5,530,483 and 5,751,368 deal with measuring video delays and identifying video signal by inspection of the images carried in the video signal, but do not make any comparison or other inspection of video and audio signals. U.S. Pat. No. 5,572,261 teaches the use of actual mouth images in the video signal and sounds in the associated audio signal to measure the relative synchronization. U.S. Pat. No. 5,572,261 describes a mode of operation of detecting the occurrence of mouth sounds in both the lips and audio. For example, when the lips take on a position used to make a sound like an E and an E is present in the audio, the time relation between the occurrence of these two events is used as a measure of the relative delay therebetween. The description in U.S. Pat. No. 5,572,261 describes the use of a common attribute for example such as particular sounds made by the lips, which can be detected in both audio and video signals. The detection and correlation of visual positioning of the lips corresponding to certain sounds and the audible presence of the corresponding sound is computationally intensive leading to high cost and complexity.

In a paper, J. Hershey, and J. R. Movellan ("Audio-Vision: Locating sounds via audio-visual synchrony" Advances in Neural Information Processing Systems 12, edited by S. A. Solla, T. K. Leen, K-R Muller. MIT Press, Cambridge, Mass. (MIT Press, Cambridge, Mass., ©2000)) it was recognized that sounds could be used to identify corresponding individual pixels in the video image The correlation between the audio signal and individual ones of the pixels in the image were used to create movies that show the regions of the video that have high correlation with the audio and from the correlation data they estimate the centroid of image activity and use this to find the talking face. Hershey et al. described the ability to identify which of two speakers in a television image was speaking by correlating the sound and different parts of the face to detect synchronization. Hershey et al. noted, in particular, that "[i]t is interesting that the synchrony is shared by some parts, such as the eyes, that do not directly contribute to the sound, but contribute to the communication nonetheless." There was no suggestion by Hershey and Movellan that their algorithms could measure synchronization or perform any of the other features of the present invention.

In another paper, M. Slaney and M. Covell ("FaceSync: A linear operator for measuring synchronization of video facial images and audio tracks" available at www.slaney.org). described that Eigen Points could be used to identify lips of a speaker, whereas an algorithm by Yehia, Ruben, Batikiotis-Bateson could be used to operate on a corresponding audio signal to provide positions of the fiduciary points on the face The similar lip fiduciary points from the image and fiduciary points from the Yehia algorithm were then used for a comparison to determine lip sync. Slaney and Covell went on to describe optimizing this comparison in "an optimal linear detector, equivalent to a Wiener filter, which combines the information from all the pixels to measure audio-video synchronization." Of particular note, "information from all of the pixels was used" in the FaceSync algorithm, thus decreasing the efficiency by taking information from clearly unrelated pixels. Further, the algorithm required the use of training to specific known face images, and was further described as "dependent on both training and testing data sizes." Additionally, while Slaney and Covell provided mathematical explanation of their algorithm, they did not reveal any practical manner to implement or operate the algorithm to accomplish the lip sync measurement. Importantly the Slaney and Covell approach relied on fiduciary points on the face, such as corners of the mouth and points on the lips.

The video and audio signals in a television system are increasingly being subjected to more and more steps of digital processing. Each step has the potential to add a different amount of delay to the video and audio, thereby introducing a lip sync error. Incorrect lip sync is a major concern to newscasters, advertisers, politicians and others who are trying to convey a sense of trust, accuracy and sincerity to their audience. Studies have demonstrated that when lip sync errors are present, viewers perceive a message as less interesting, more unpleasant, less influential and less successful than the same message with proper lip sync.

Because light travels faster than sound, we are used to seeing events before we hear them—lightning before thunder, a puff of smoke before a cannon shot and so on. Therefore, to some extent, we can tolerate "late" audio. Unfortunately, as shown in FIG. 1, even in a simple television system, the video is almost always delayed more than the audio, creating the unnatural situation of "early" audio. Any one contributor to the lip sync error may or may not be noticeable. But the cumulative error from the original acquisition point to the viewer can easily become both noticeable and objectionable. The potential for lip sync errors increases even further when MPEG compressed links are added to one or more stages of the overall system—however, that's a topic for another day.

From CCD cameras, to frame synchronizers, production switchers, digital video effects, noise reducers, MPEG encoders and decoders, TVs with digital processing and the like, the video is delayed more than the audio. Worse yet, the amount of video delay frequently jumps by a frame or more as the operating mode changes, or as frames of video are dropped or repeated. So, using a fixed audio delay to "mop up" the errors is rarely a satisfactory solution.

Standards committees in various countries have studied the lip sync problem and have set guidelines for the maximum allowable errors. For the most part, these studies have determined that lip sync errors become noticeable if the audio is early by more than 25-35 milliseconds (about 1 NTSC frame) or late by more than 80-90 milliseconds (2.5-3.0 NTSC frames). In June of 2003, the Advanced Television Systems Committee (ATSC) issued a finding that stated " . . . at the inputs to the DTV encoding device . . . the sound program should never lead the video program by more than 15 milliseconds, and should never lag the video program by more than 45 milliseconds." The finding continued "Pending [a finding on tolerances for system design], designers should strive for zero differential offset throughout the system." In other words, it is important to eliminate or minimize the errors at each stage where they occur, instead of allowing them to accumulate.

Fortunately, the "worst case" condition in FIG. 3 is now less likely to present itself than was the case a few years ago. Firstly, it is now quite common to install audio tracking delays, exemplified by the Pixel Instruments AD-3000, alongside each video frame synchronizer, thereby eliminating at least one common source of variable lip sync errors.

Secondly, newer master control switchers have an internal DVE for squeezeback operation rather than an external DVE. This allows the use of a constant insertion delay of 1 frame for both the video and the audio paths in all modes of operation.

Since the 1970s, digital video effects processors (DVEs or transform engines) have been used to produce "over the shoulder", "double box" and other multiple source composited effects. The video being transformed is delayed (usually by one or more frames) relative to the background video in the switcher. So, any time one or more DVE processors are on-air, the associated video sources will be delayed, resulting in a lip sync error. In the past, when the DVE processor was external to the switcher, a tally signal from the switcher could be used to trigger the insertion of a compensating audio delay when the DVE in on-air. However, today's production switchers are usually equipped with internal DVEs and a tally output is no longer available.

Thus, a need exists for a lip synchronization method providing direct comparison of the video images conveyed in the video portion of a signal to one or more characteristics in an associated signal, such as an audio signal.

SUMMARY OF THE INVENTION

The present invention provides for directly comparing images conveyed in the video portion of a signal to characteristics in an associated signal, such as an audio signal. Thus, contrary to the disclosure in U.S. Pat. No. 5,572,261, it is unnecessary to look for or utilize a common attribute (such as speech syllables) within audio and video portions of the program. The preferred embodiment of the present invention is method, apparatus, and program product where audio and video portions of multi-media content, e.g., a television or other program, may be directly inspected to obtain a measure of their synchrony.

The method, system, and program product described herein provide for determining the relative timing of a video signal conveying a plurality of images and an associated signal, as an audio signal. This is accomplished by receiving the video signal, and identifying video mutual events in images of the video signal. The associated signal, for example, an audio signal is received and mutual events are identified in the associated signal, typically an audio signal. The video mutual events and the mutual events in the associated signal are compared to determine the relative timing between the video signal and the associated signal.

A plurality of video signals may be compared to an associated signal, or a plurality of associated signals may be compared to a video signal, or pluralities of both may be compared, depending on the particular implementation of the invention. The comparison may be utilized in the above mentioned tasks, for example to determine the delay between video and associated signal, to determine if the video is related to one or more particular associated signals or to determine if an associated signal is related to one or more video signals.

These comparisons and resulting determinations may be utilized as a measure of information which is useful about the signals being compared, and/or may be used to facilitate further operations for example such as the selection of an associated or video signal, the adjustment of timing of a video or associated signal to facilitate timing correction or preservation. Of particular note is the preferred embodiment of the invention, which is described by way of example, wherein the images carried by a video signal are directly compared to a corresponding signal to determine the relative delay therebetween. The relative delay may then be used to correct or maintain proper timing of the signals. Note that the inventor uses the words "determine the relative delay" to mean merely to indicate whether or not the relative delay is proper, and not to mean measure or provide a measure. While the measurement or providing a measure will be taught, when one or the other is the intended meaning appropriate wording other than determine will be used.

Unlike the description of U.S. Pat. No. 5,572,261, no mouth, mouth sounds or similar occurrences are needed in the audio or video. While such occurrences may be incidentally utilized by the present invention, the operation of the present invention is such that it is not so limited, and may very well operate with any association between the video image and the associated signal giving a statistical probability of some useful correlation. Moreover, the description in U.S. Pat. No. 5,572,261, the method, system, and program described herein may operate with no lips or face present in the video and no speech present in the audio. For example, with respect to video the image of a bat striking a ball and the associated audible crack of the bat is one type of occurrence which may be utilized by the invention.

There are often statistical relationships between sounds and images which may be utilized by the present invention to obtain a measure or indication of the relative synchronization therebetween. The association of a change of brightness of points in the video image and the change of sound level in the audio or the change of the volume of data in a data signal are other associations which the invention may make use of.

As used herein the term "muev" is the contraction of MUtual EVent to mean an event occurring in an image, signal or data which is unique enough that it may be accompanied by another muev in an associated signal. Accordingly, an image muev may have a probability of matching a muev in an associated signal. For example in respect to the bat hitting the ball example above, the crack of the bat in the audio signal is a muev and the swing of the bat is also a muev. Clearly the two each have a probability of matching the other in time. The detection of the video muev may be accomplished by looking for motion, and in particular quick motion in one or a few limited area of the image while the rest of the image is static, i.e. the pitcher throwing the ball and the batter swinging at the ball. In the audio, the crack of the bat my be detected by looking for short, percussive sounds which are isolated in time from other short percussive sounds. One of ordinary skill in the art will recognize from these teachings that other muevs may be identified in associated signals and utilized for the present invention.

Many of today's production switchers incorporate programmable timelines for the storage and recall of switcher configuration and effects. Typically a number of interrupts, as General Purpose Interrupts (hereinafter "GPI") and Tally contact closures can be stored in these timelines to control external devices. Since the video delay through the switcher is usually predictable (based on the combination of effects), an external interface can be used to interpret these GPI and tally outputs and generate the necessary steering commands to control audio synchronizers. This permits automatic correction of the lip sync errors. For example, the DG-1200 interface from Pixel Instruments can be preset to provide up to twelve different delays and can steer up to five audio synchronizers. Depending on the application, the insertion of the audio delay can be triggered by tally signals, GPIs, or a combination of both. Gating the tally signal with GPIs will improve the immunity to false delay insertion.

THE FIGURES

FIG. 8 is a portion of the flow chart for an initial step for correcting head tilt.

FIG. 9 is a portion of the flow chart for tilting the face to vertical and isolating the lips.

FIG. 10 is a portion of the flow chart for isolating pixels of the upper lip.

FIG. 11 is a portion of the flow chart for isolating the upper lip.

FIG. 12 is a portion of the flow chart for continuing isolation of the upper lip.

FIG. 13 is a portion of the flow chart for continuing the process of FIGS. 11 and 12.

FIG. 14 is a portion of the flow chart for characterizing the upper limit determined in accordance with the process shown in FIGS. 10 through 13.

FIG. 15 is a portion of the flow chart for continuing the process of FIGS. 10 through 14 and matching the upper lip to a lower lip.

FIG. 16 is a portion of the flow chart for characterizing the lower lip.

FIG. 17 is a portion of the flow chart for characterizing both lips.

FIG. 18 is a portion of the flow chart for characterizing a sequence of lip movements to characterize video mutual events.

FIG. 19 is a portion of the flow chart for further characterizing the sequence of lip movements.

FIG. 20 is a portion of the flow chart for going to the next frame.

DETAILED DESCRIPTION OF THE INVENTION

The preferred embodiment of the invention has an image input, an image mutual event identifier which provides image muevs, and an associated information input (typically an audio input), an associated information mutual event identifier which provides associated information muevs. The image muevs and associated information muevs are suitably coupled through a comparison operation which compares the two types of muevs to determine their relative timing.

In particular embodiments of the invention, muevs may be labeled in regard to the method of conveying images or associated information, or may be labeled in regard to the nature of the images or associated information. For example video muev, brightness muev, red muev, chroma muev and luma muev are some types of image muevs and audio muev, data muev, weight muev, speed muev and temperature muev are some types of associated muevs which may be commonly utilized.

Figure 1:
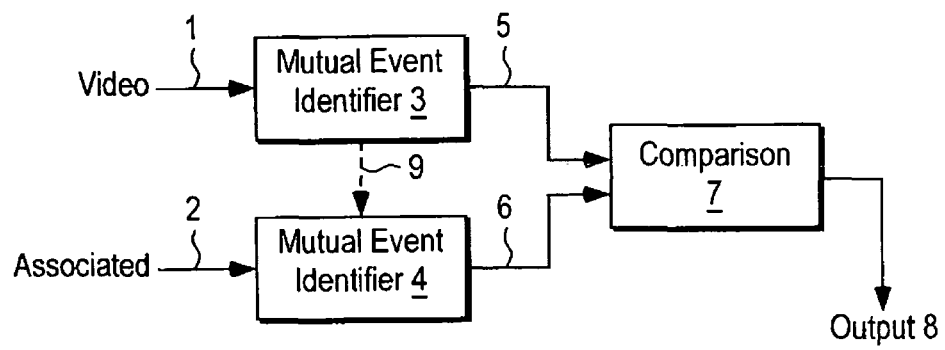
FIG. 1 shows a diagram of the present invention with images conveyed by a video signal and associated information conveyed by an associated signal and a synchronization output.

FIG. 1 shows the preferred embodiment of the invention wherein video conveys the images and an associated signal conveying the associated information. FIG. 1 has video input 1, mutual event identifier 3 with muev output 5, associated signal input 2, mutual event identifier 4 with muev output 6, comparison 7 with output 8.

Figure 2:
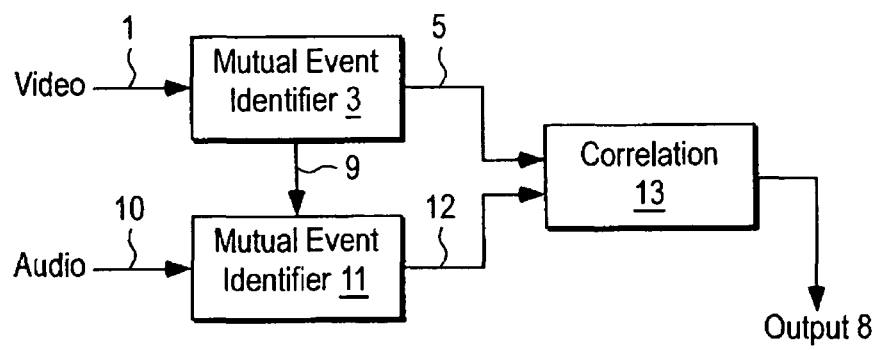
FIG. 2 shows a diagram of the present invention as used with a video signal conveying images and an audio signal conveying associated information.
Figure 3:
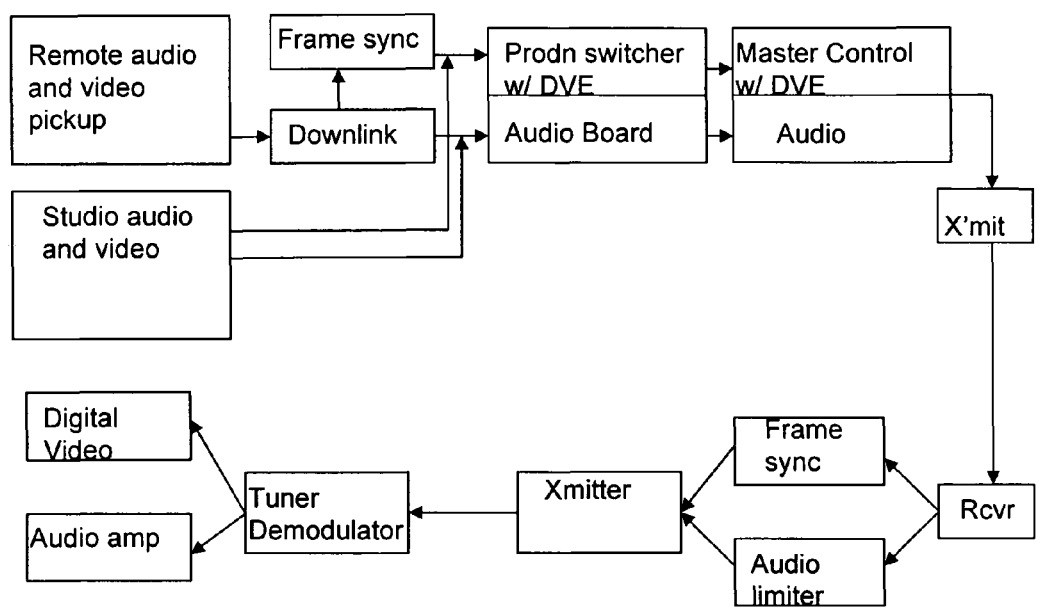
FIG. 3 illustrates a typical train of processes and units to go from a multi-media pickup, through pre-transmission level processing, transmission, receiving, receiver level processing (including tuning and demodulation) to final presentation to an end user or viewer.

FIG. 2 shown a particular embodiment of the invention as utilized with television program audio and video signals. FIG. 2 shows video input and video muev identifier and output and video time period coupling, 1, 3, 5 and 9 respectively as in FIG. 1, and audio input 10, audio muev identifier and output 11 and 12, and correlation 13.

Audio muev identifier 11 is preferred to inspect the audio signal over time intervals of a sliding time window of three hundred milliseconds and determine significant changes in the audio power envelope within that window. The peaks of envelope changes (either positive or negative) of greater or lesser than 30% of the average over the same window are identified as muevs. The number of muevs identified within each video frame (as enabled by 9) is output at 12 as a binary number.

In operation, video muevs from 5 and audio muevs from 12 are present for each video frame, noting that if no muevs occur a zero is output. The numbers of muevs are correlated by 13 over a time period of several seconds, for example 5 seconds, to provide a measure of the synchronization between audio at 10 and video at 1. While in some applications it is simply desirable to know if audio and video are synchronized, or synchronized within defined limits, in other applications the amount and direction of synchronization error will be desired. These measurements may be had by known correlation techniques as will be apparent to one of ordinary skill in the art from the present teachings.

Many of today's production switchers incorporate programmable timelines for the storage and recall of switcher configuration and effects. Typically a number of GPI and Tally contact closures can be stored in these timelines to control external devices. Since the video delay through the switcher is usually predictable (based on the combination of effects), an external interface can be used to interpret these GPI and tally outputs and generate the necessary steering commands to control audio synchronizers. This permits automatic correction of the lip sync errors. An interface, such as the DG-1200 interface from Pixel Instruments can be preset to provide up to twelve different delays and can steer up to five audio synchronizers. Depending on the application, the insertion of the audio delay can be triggered by tally signals, GPIs, or a combination of both. Gating the tally signal with GPIs will improve the immunity to false delay insertion.

Figure 4:
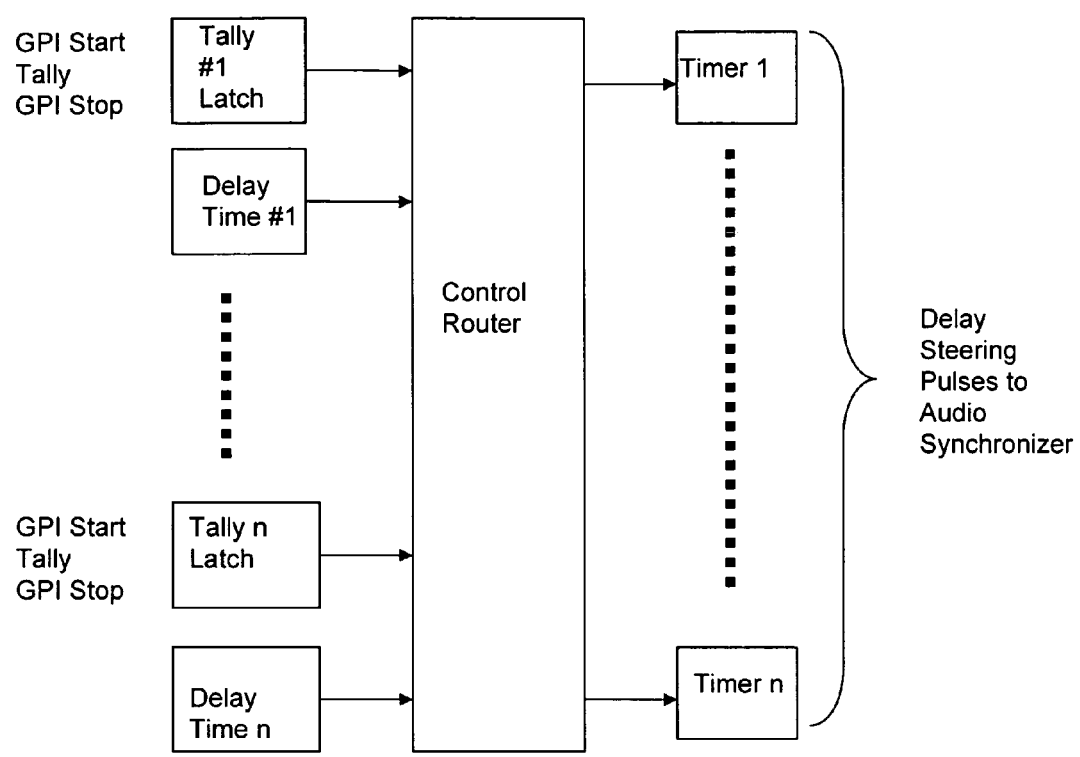
FIG. 4 shows a system for using General Program Interrupts and Tallies, through a control router, to timers, to generate delay steering pulses to an audio synchronizer.

FIG. 4 illustrates one system where GPI start signals, Tally signals, and GPI stop signals are input to tally latches. The outputs, a timer on/off signals and time values, are input to a control router. The control router outputs On/Off and Time signals to individual timers, which in turn generate delay steering pulses to audio synchronizers.

As shown in FIG. 4 each of the twelve input channels consists of a GPI Start pulse, a GPI Stop pulse and a Tally line. Each input channel also has a linked delay time register with a user selectable value from 20 μsec (nominally zero delay) up to 6.5 seconds, in increments of 100 μsec. Delay times can be entered and displayed in milliseconds or in TV fields (NTSC or PAL).

Any input channel and its time value can be routed to any of the five output timers and each timer can steer a separate audio synchronizer, as an AD-3100 Audio Synchronizer. The output timers can have different time values and can be turned on and off independently. Also, any timer can be controlled by more than one input channel. Assume that one switcher effect needs a 1 frame audio delay and another effect needs a 2 frame audio delay. Input #1 (or any other input) can enable a 1 frame delay in Timer #3 (or any other timer) and the associated audio synchronizer, as an AD-3100. Any other input can be used to enable a 2 frame delay in the same timer.

Pre-Delayed Audio Application

Figure 5:
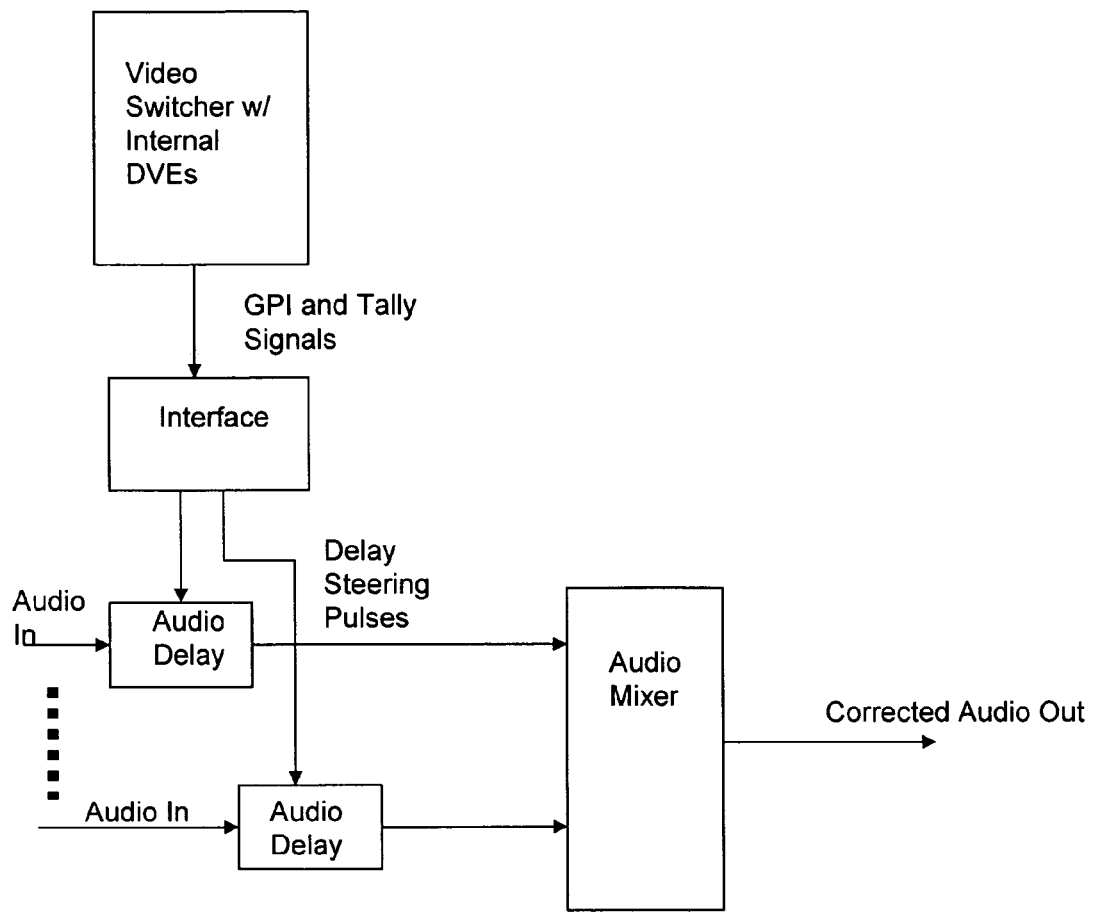
FIG. 5 illustrates a system for receiving video inputs through a video switcher with internal DVE's to generate GPI's and Tally signals, to an interface with audio delays that generates delay steering pulses to an audio mixer, where the audio mixer provides a corrected audio output.

The most comprehensive solution is to add an audio synchronizer, as an AD-3100 Audio Synchronizers, ahead of the audio mixer as shown in FIG. 5. This configuration ensures that all sources contributing to the program output have the correct lip sync.

For applications that require more than 5 audio inputs to be delayed, this solution is scaleable with additional DG-1200s and AD-3100s.

Post-Delayed Audio Application

Figure 6:
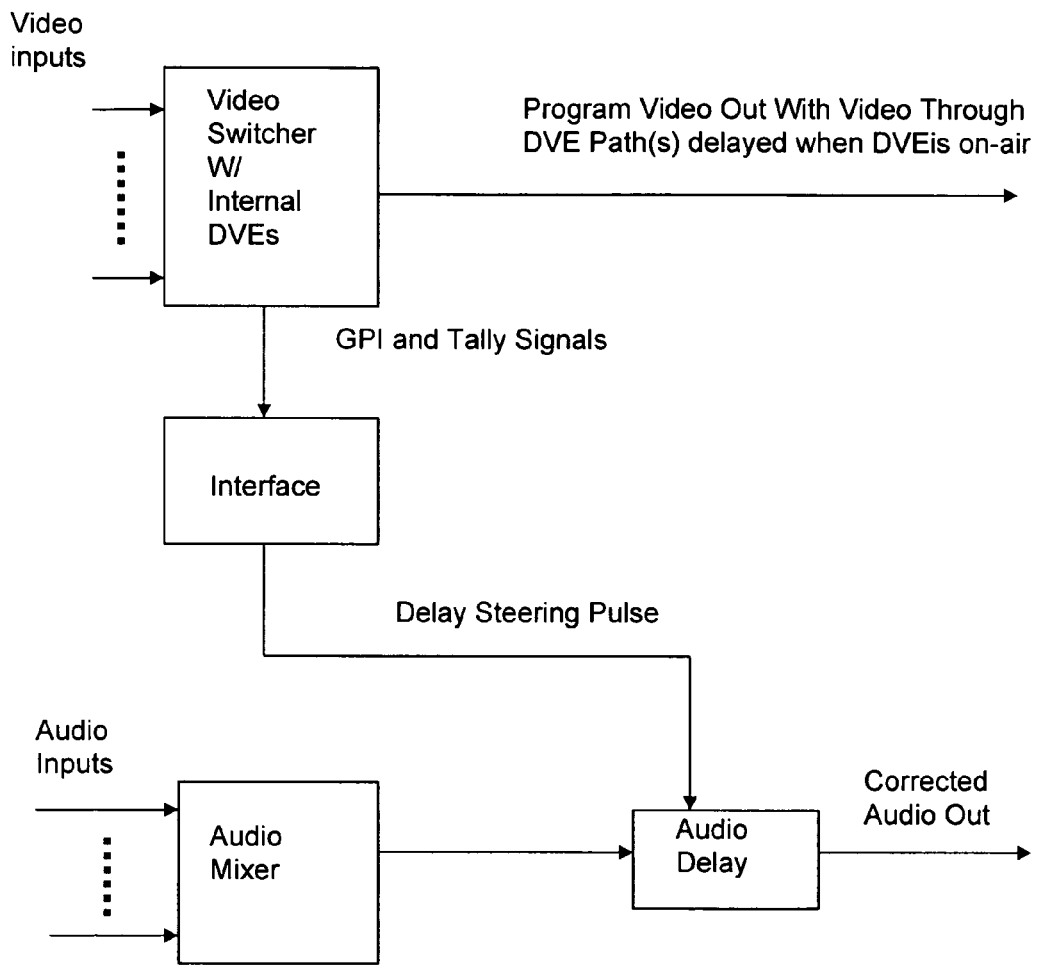
FIG. 6 illustrates video inputs and audio inputs with video and corrected video outputs.

A simpler, but less comprehensive solution is shown in FIG. 6, where a single audio synchronizer, as an AD-3100 Audio Synchronizer is added at the output of the Audio Mixer. The amount of delay added to the audio path is chosen as a compromise for the various sources contributing to the program output in any given effect.

For example, in a typical newscast over the shoulder shot, the studio anchor has zero video delay and the remote reporter (in the box) has 1 frame of video delay. Setting the audio synchronizer, for example, an AD-3100 Audio Synchronizer, delay to between 0 and 0.5 frame is the best compromise for both sources. The studio anchor's audio will be slightly late and the remote reporter's audio slightly early. The residual lip sync errors are reduced compared to doing nothing at all.

Rapid Delay Change With Pitch Correction. Since the video delay of the DVE may be switched in and out of the program path several times in a relatively short period, it is essential that the audio delay "catch up" quickly. Conventional audio synchronizers typically change their delay at a rate of 0.5% or less. This means that for each 1 frame increase or decrease in the video delay, the audio does not "catch up" for 10 seconds or more.

In a preferred exemplification, the audio synchronizer, as an AD-3100, incorporates automatic pitch correction to allow rapid delay change (up to 25%) without introducing undesirable artifacts such as pitch shifts, clicks and pops in the output. So, in our example of a one frame change in the video delay, the audio synchronizer will "catch up" in just a few frames. This is well before the viewer will notice.

The combination of a programmable tally/GPI interface and a fast tracking audio synchronizer provides a flexible cost effective solution to the lip sync errors introduced by production switchers and digital effects processors. It is also applicable to systems that use a master control switcher with external effects for squeezeback operation.

Figure 7:
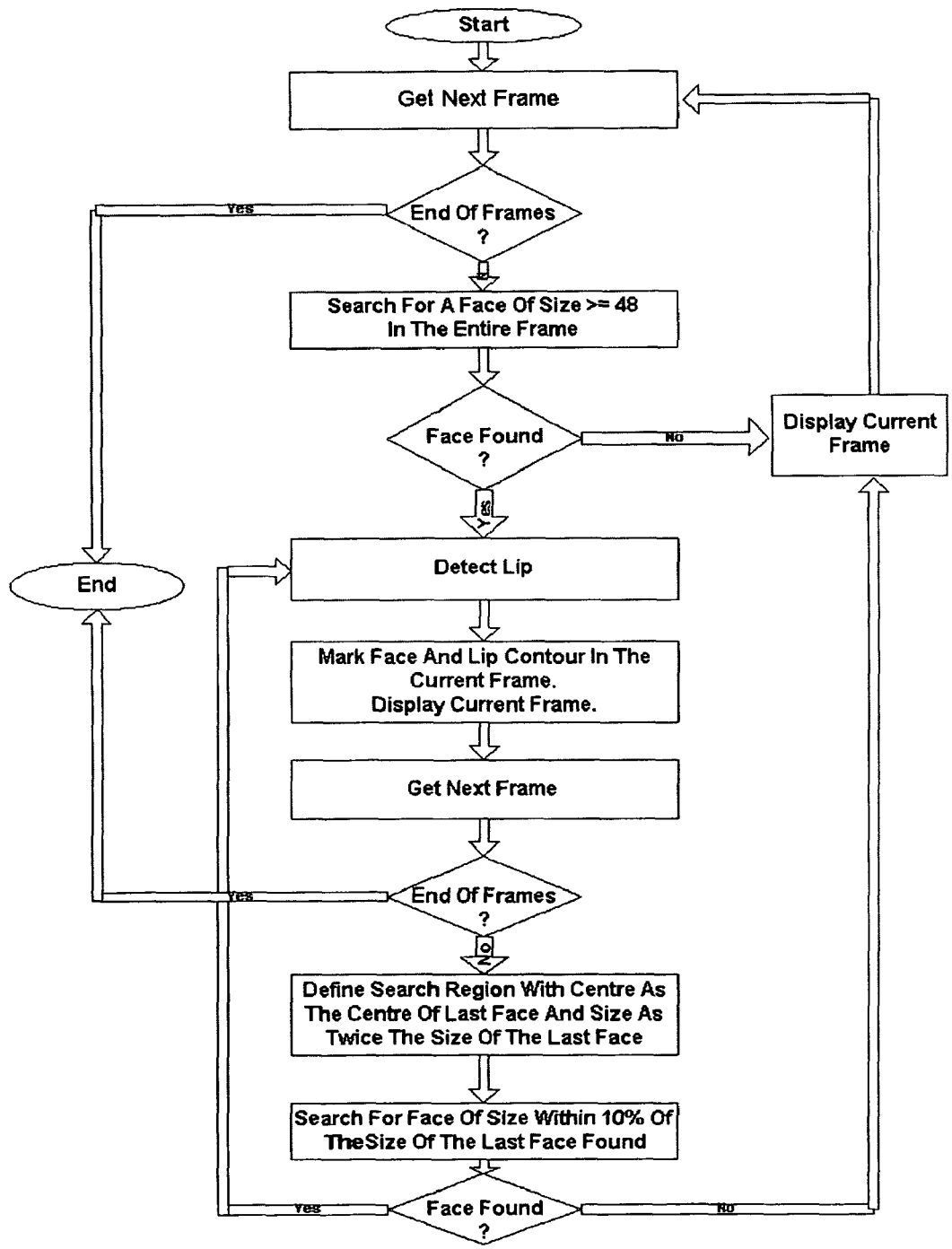
FIG. 7 illustrates a flow chart for identifying facial features, as lips, identified with speech patterns.

FIG. 7 illustrates a high level flow chart for identifying facial features, as lips, identified with speech patterns. The process starts with getting a frame, and testing to see if it is or is not the last frame. If not, the frame is searched for a face. If a face is found, a search is conducted for the lips and the facial contours.

Figure 8:
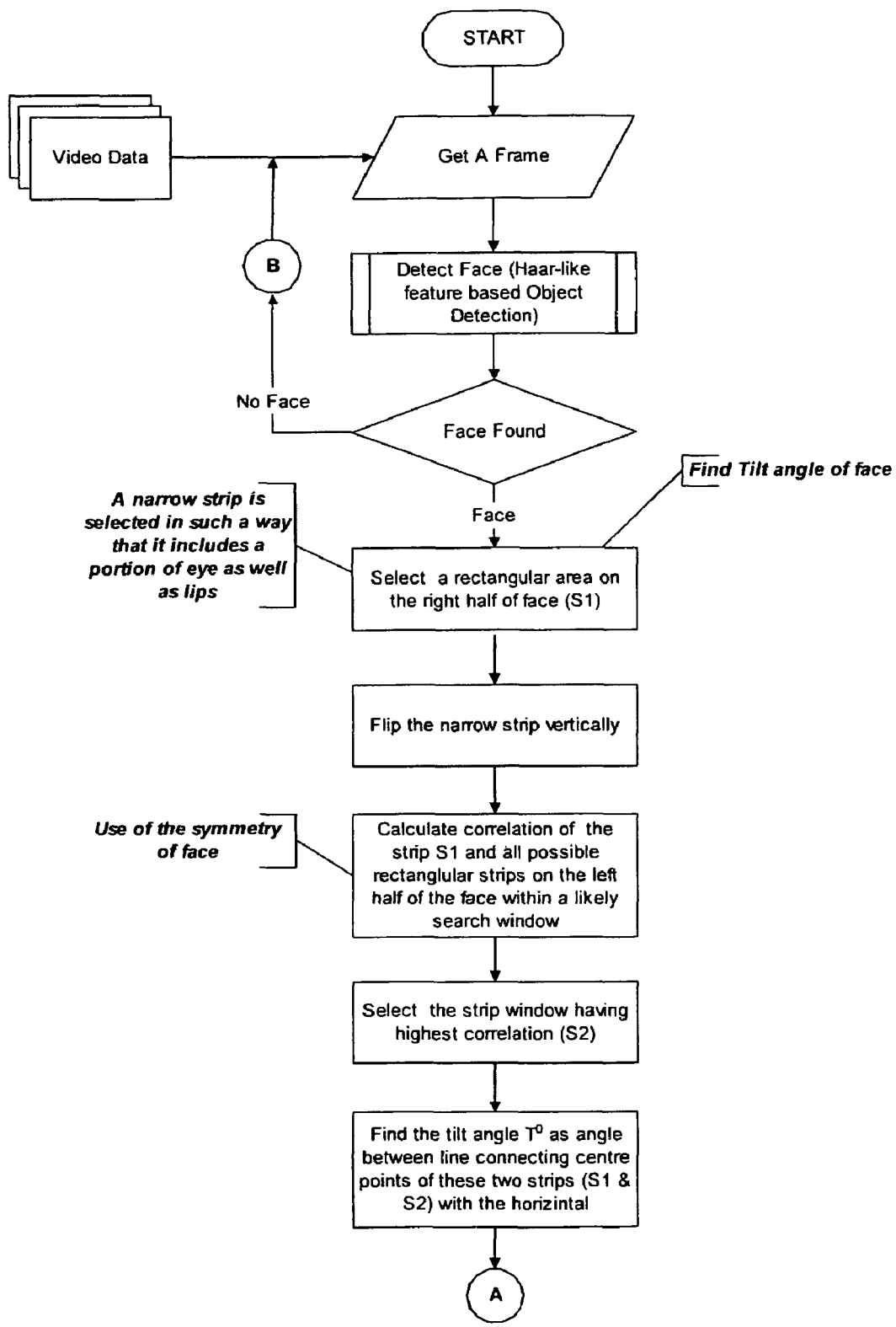
FIGS. 8 through 20 illustrate one method for isolating lip movements to obtain video mutual events associated with audio mutual events.
Figure 9:
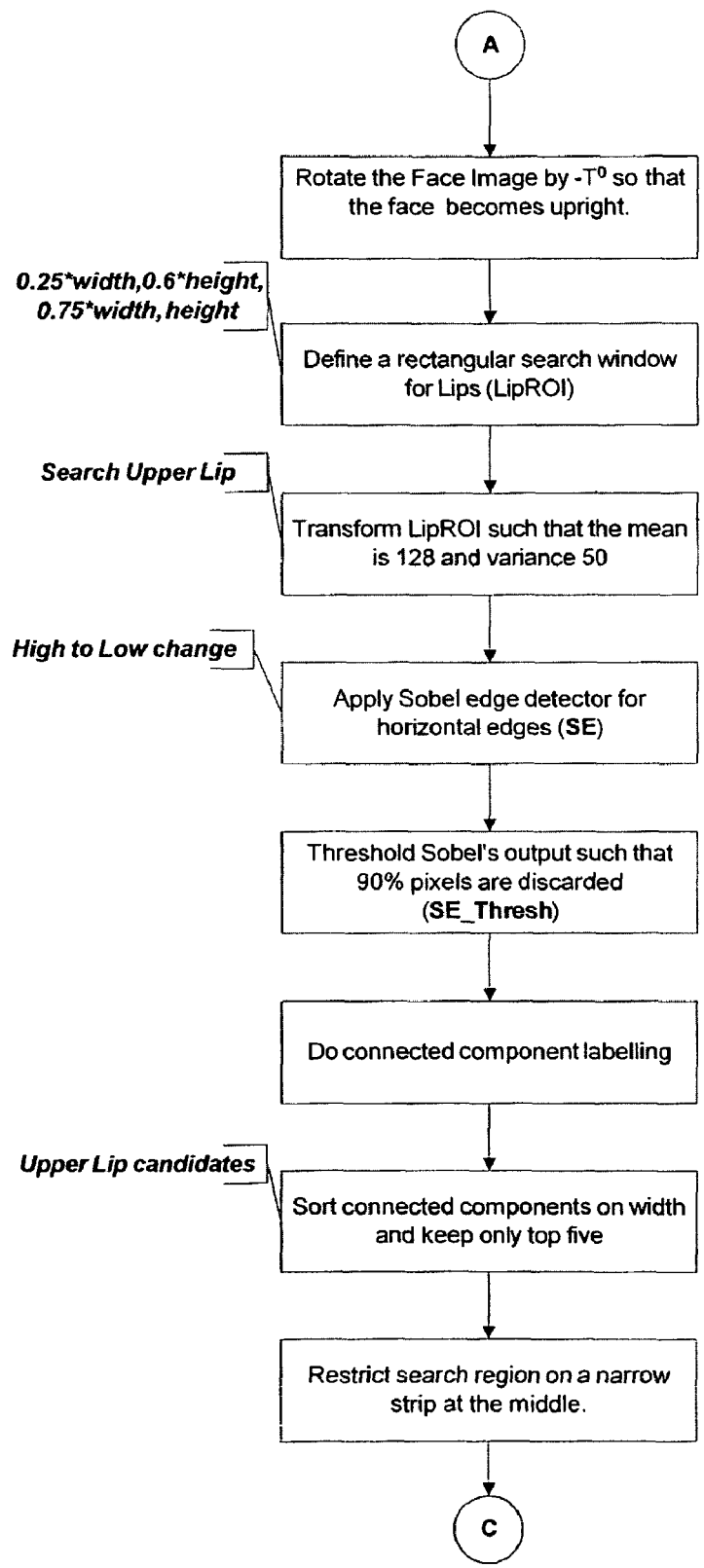

FIGS. 8 through 20 illustrate one method for isolating lip movements to obtain video mutual events associated with audio mutual events. FIG. 8 is a portion of the flow chart for an initial step for correcting head tilt. In the next stage, FIG. 9 illustrates a portion of the flow chart for tilting the face to vertical and isolating the lips.

Figure 10:
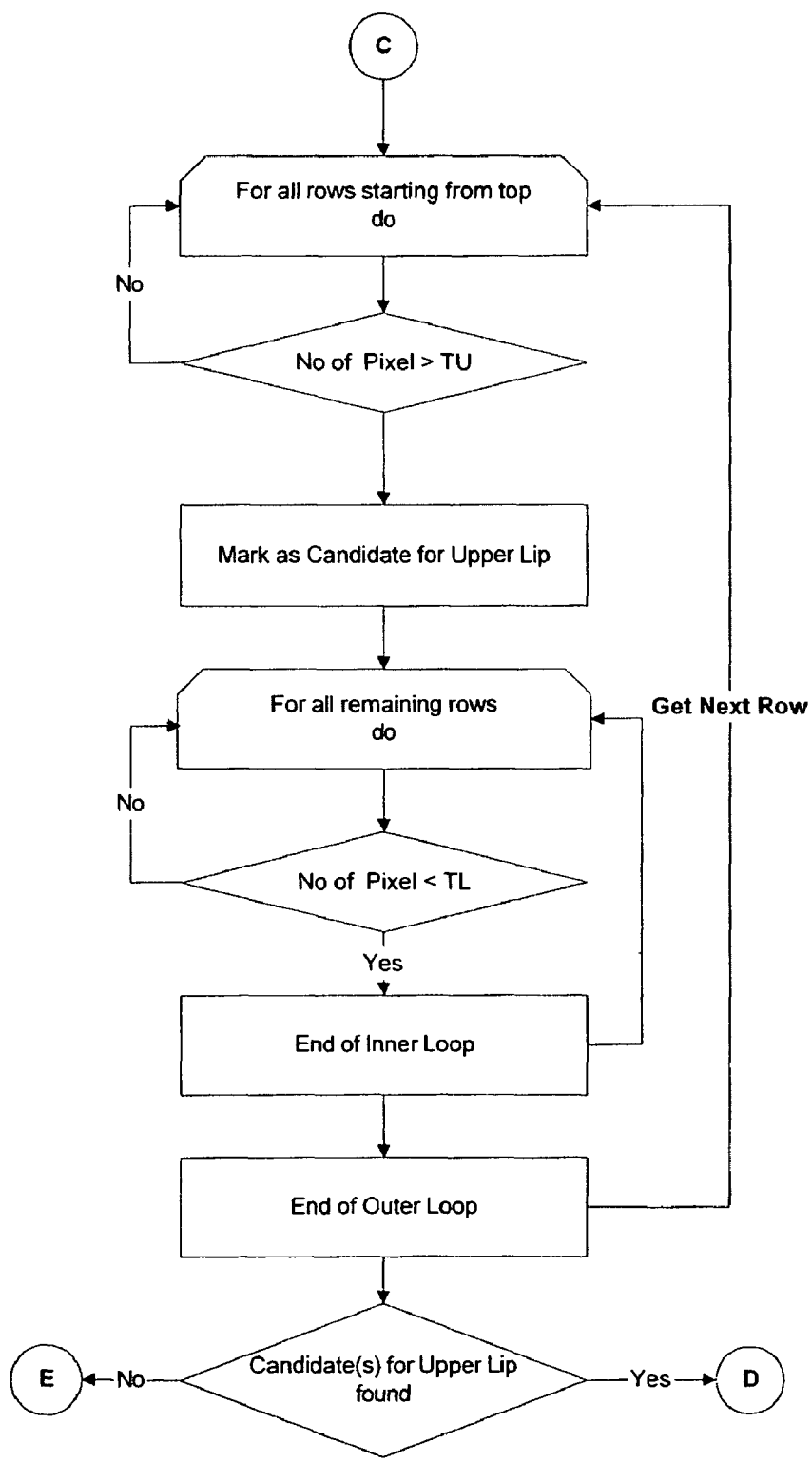
Figure 11:
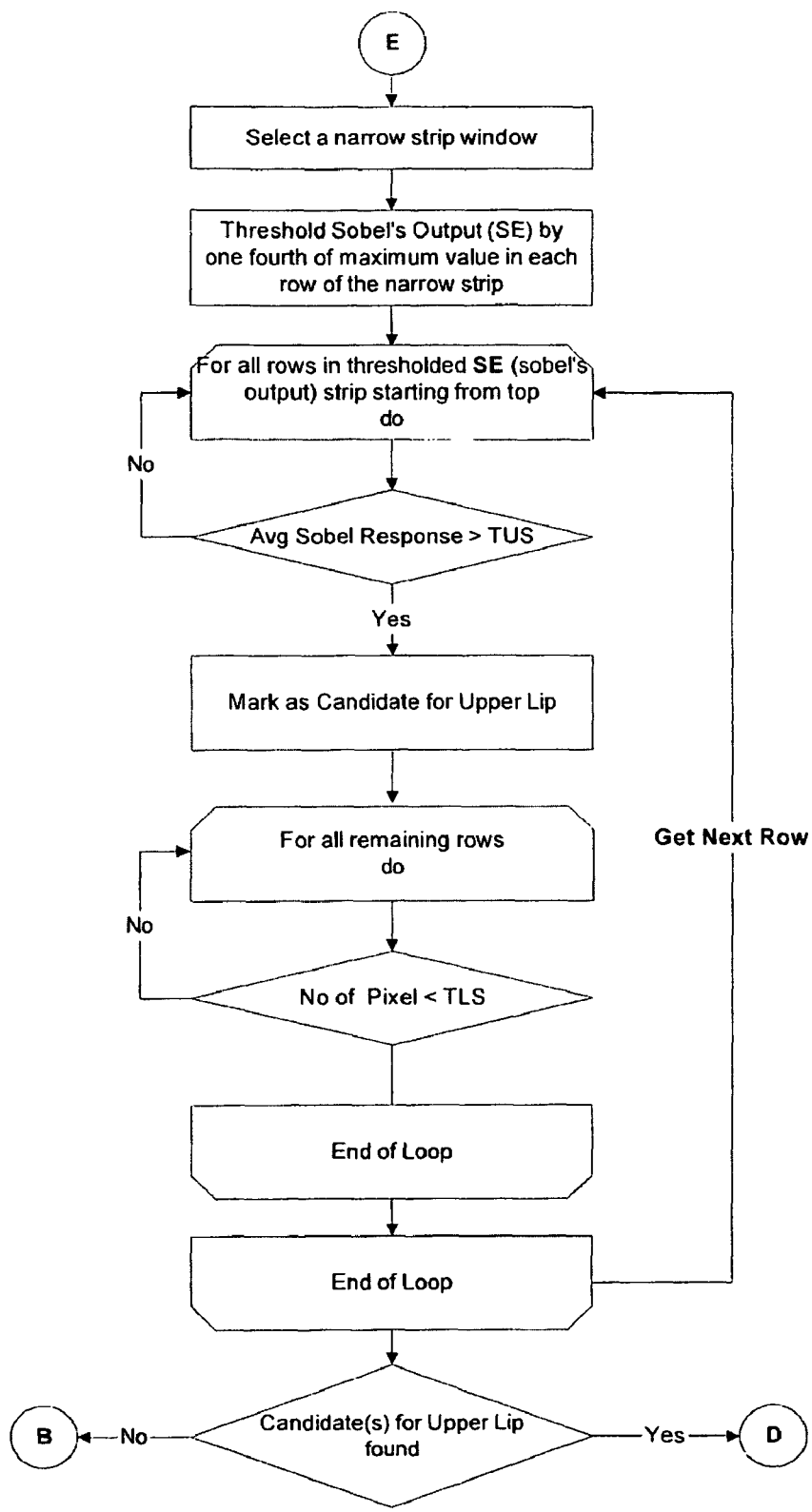
Figure 12:
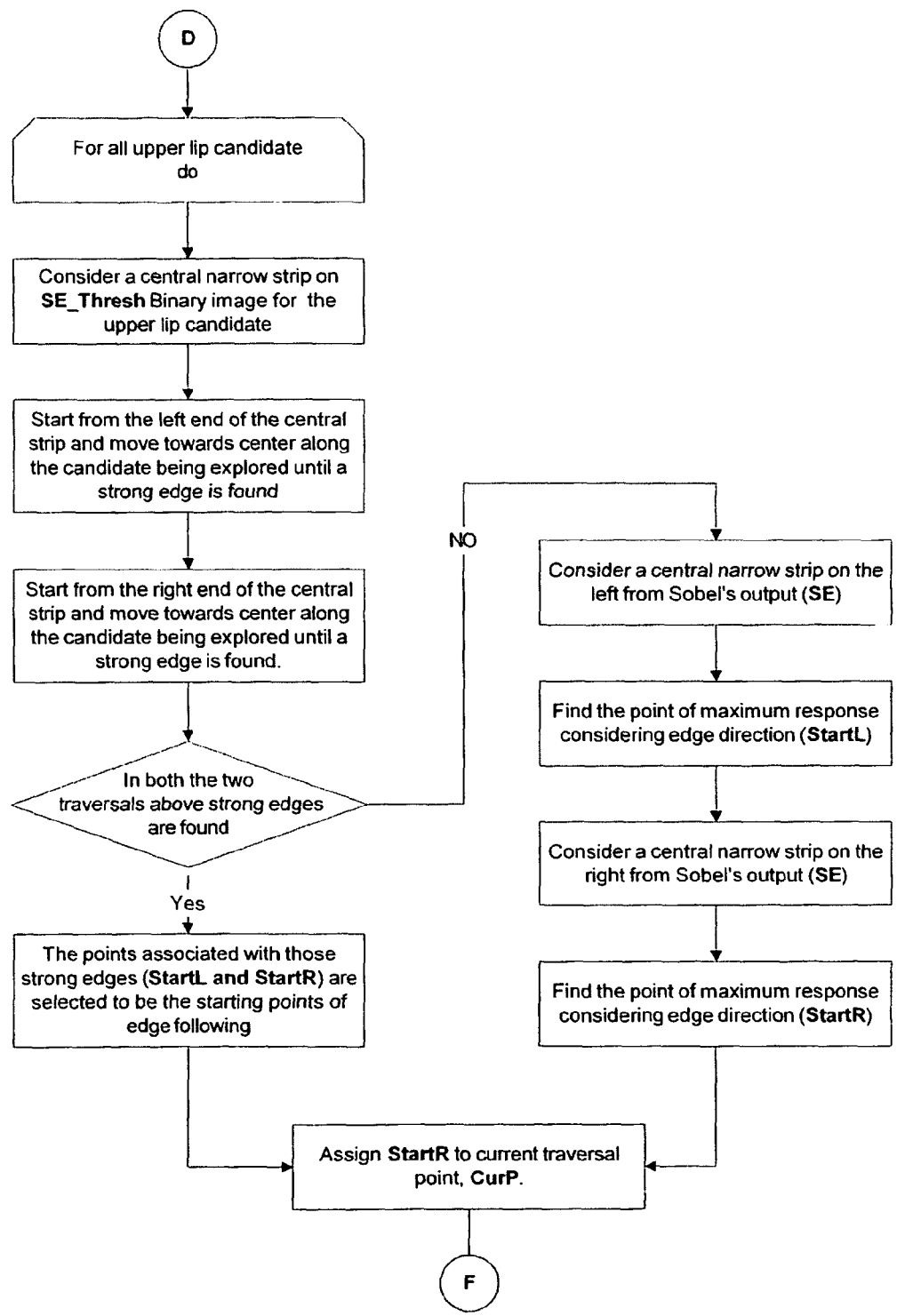
Figure 13:
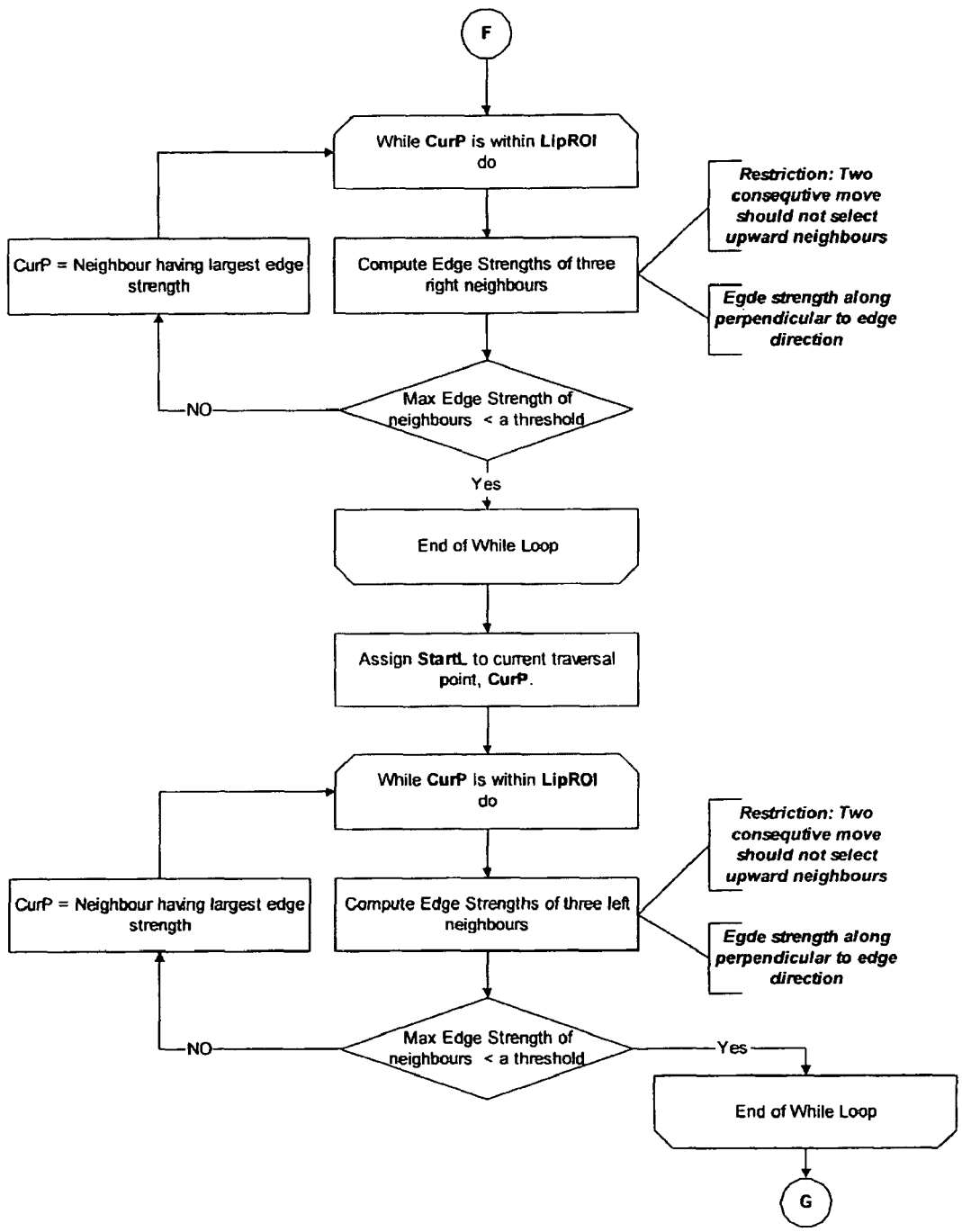

Isolating and characterizing the shape (and in a sequence of frames the movement of the lips) is a part of determining visual Muevs and correlating visual Muevs with audio Muevs. FIG. 10 is a portion of the flow chart for isolating pixels of the upper lip, while FIG. 11 is a next portion of the flow chart for isolating the upper lip. FIG. 12 is a portion of the flow chart for continuing isolation of the upper lip. FIG. 13 is a portion of the flow chart for continuing the process of FIGS. 11 and 12.

Figure 14:
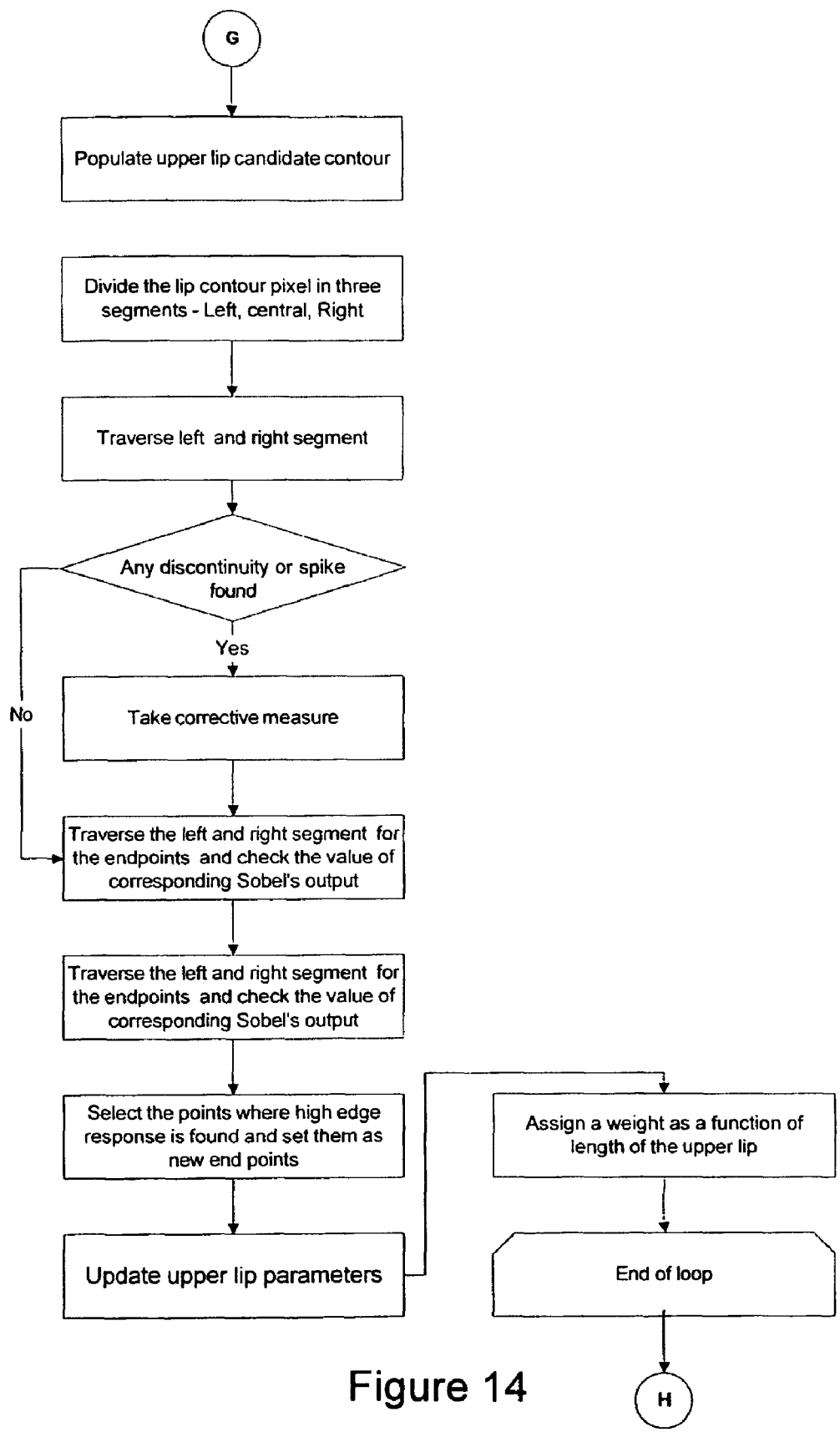
Figure 15:
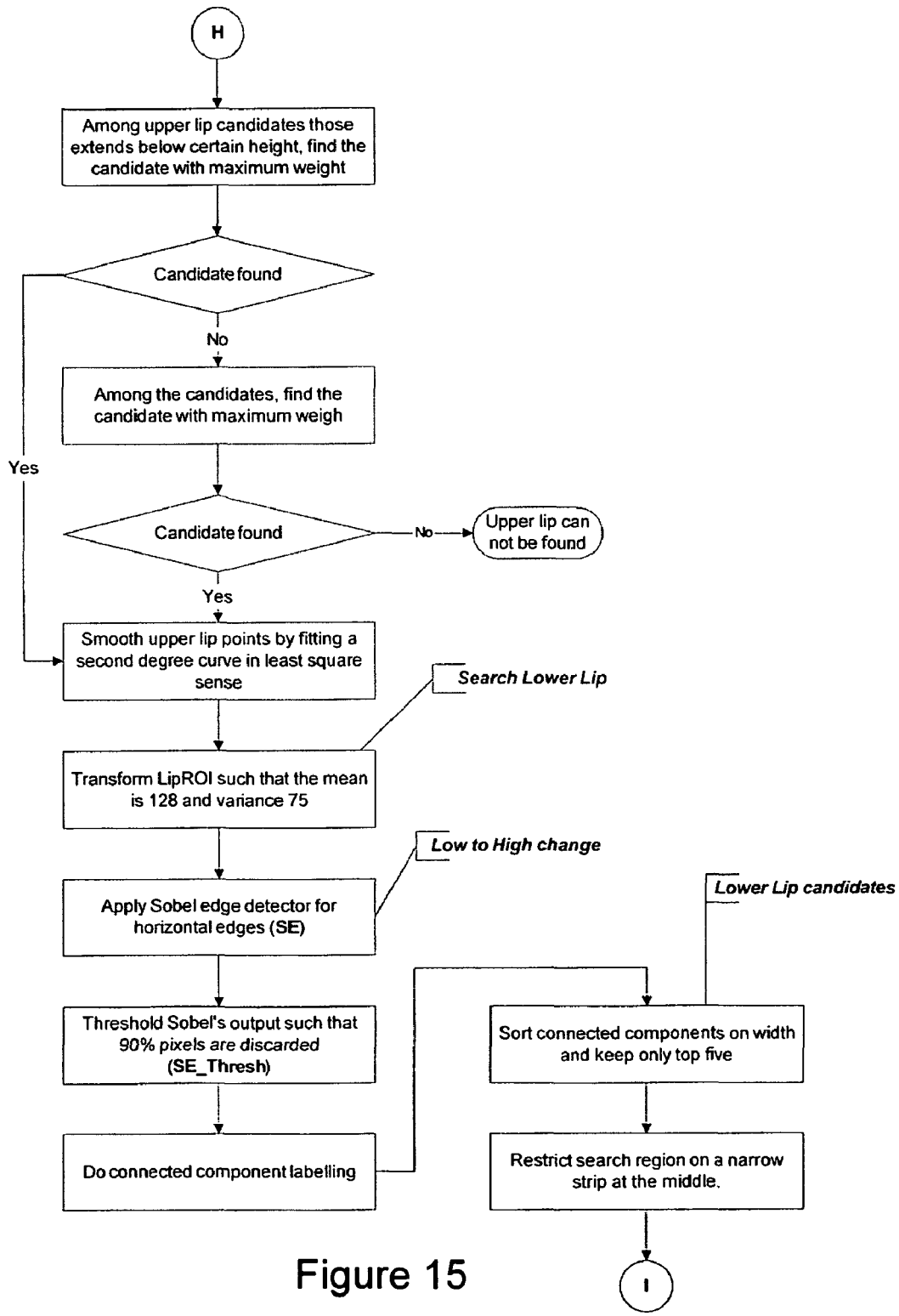

FIG. 14 is a portion of the flow chart for characterizing the upper limit determined in accordance with the process shown in FIGS. 10 through 13. FIG. 15 is a portion of the flow chart for continuing the process of FIGS. 10 through 14 and matching the upper lip to a lower lip.

Figure 16:
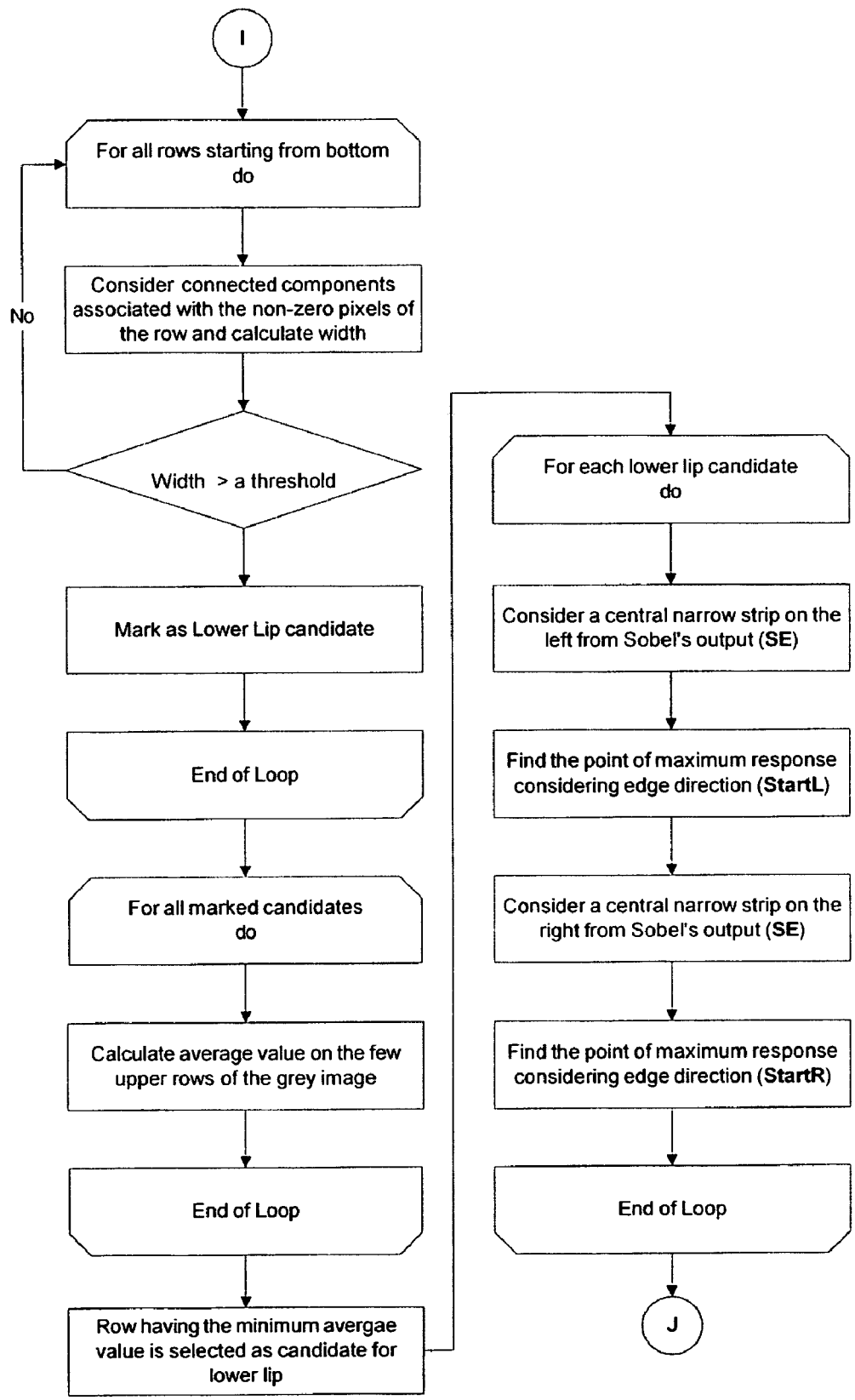
Figure 17:
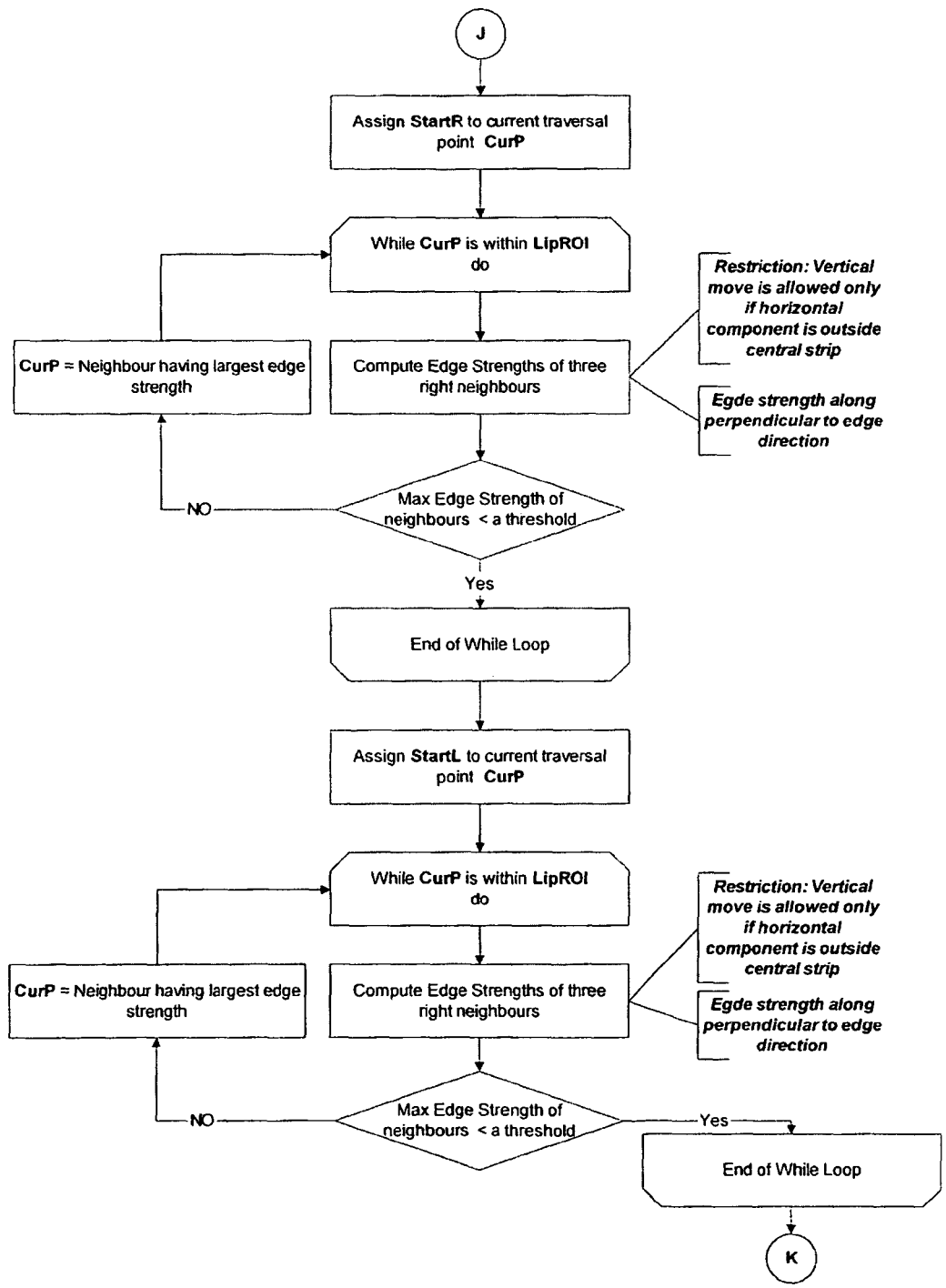

FIG. 16 is a portion of the flow chart for characterizing the lower lip. FIG. 17 is a portion of the flow chart for characterizing both lips.

Figure 18:
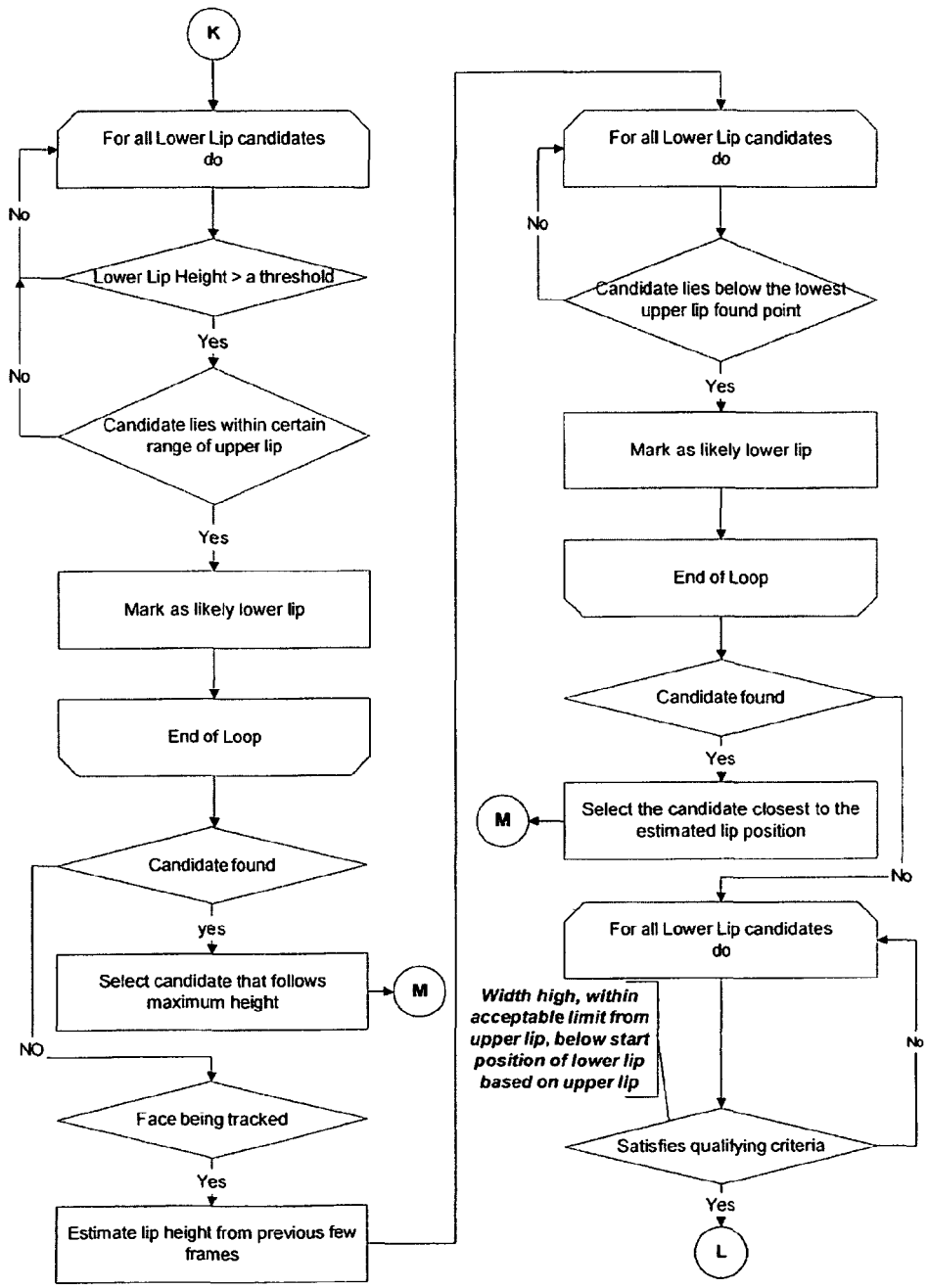
Figure 19:
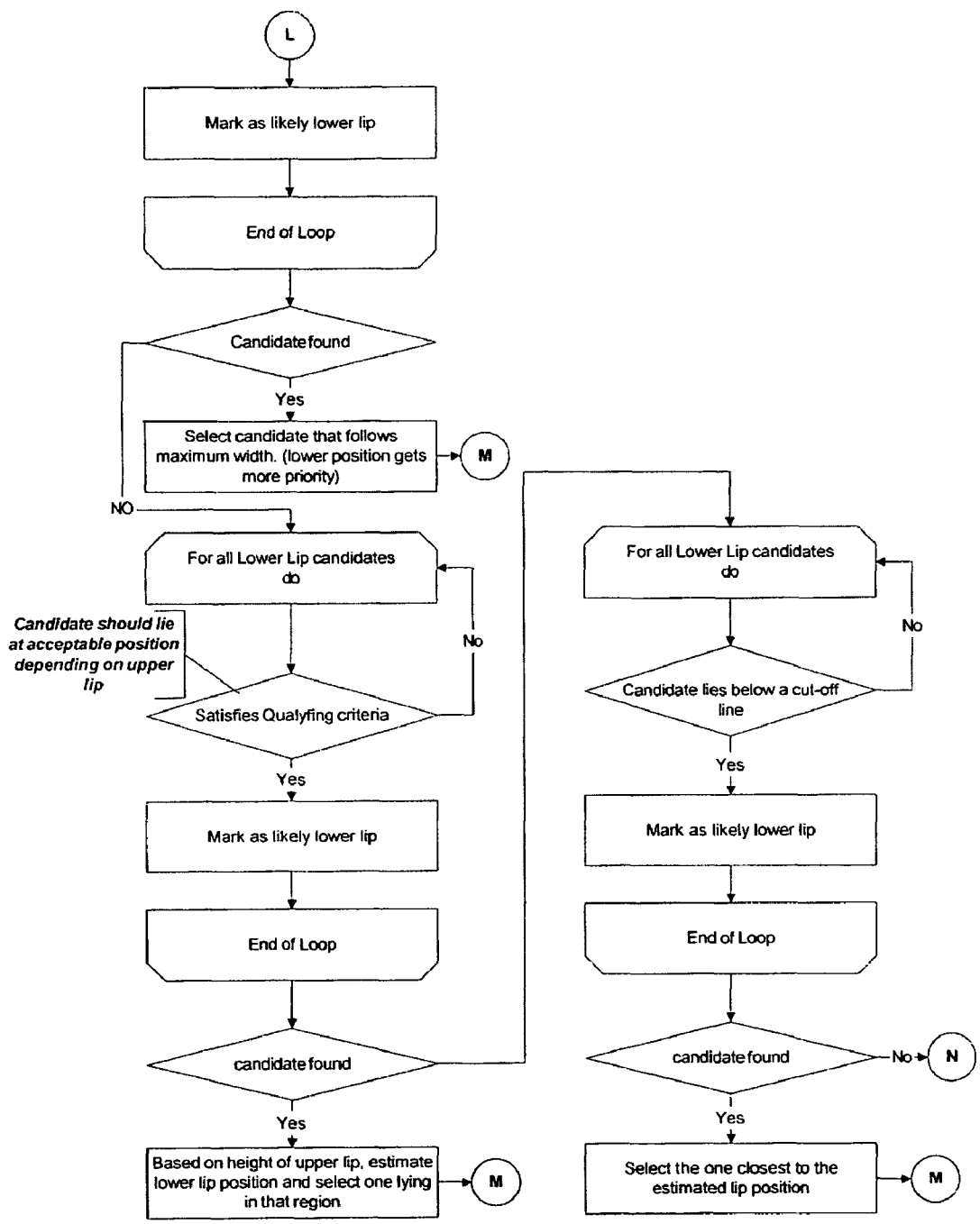

FIG. 18 is a portion of the flow chart for characterizing a sequence of lip movements to characterize video mutual events. FIG. 19 is a portion of the flow chart for further characterizing the sequence of lip movements.

Figure 20:
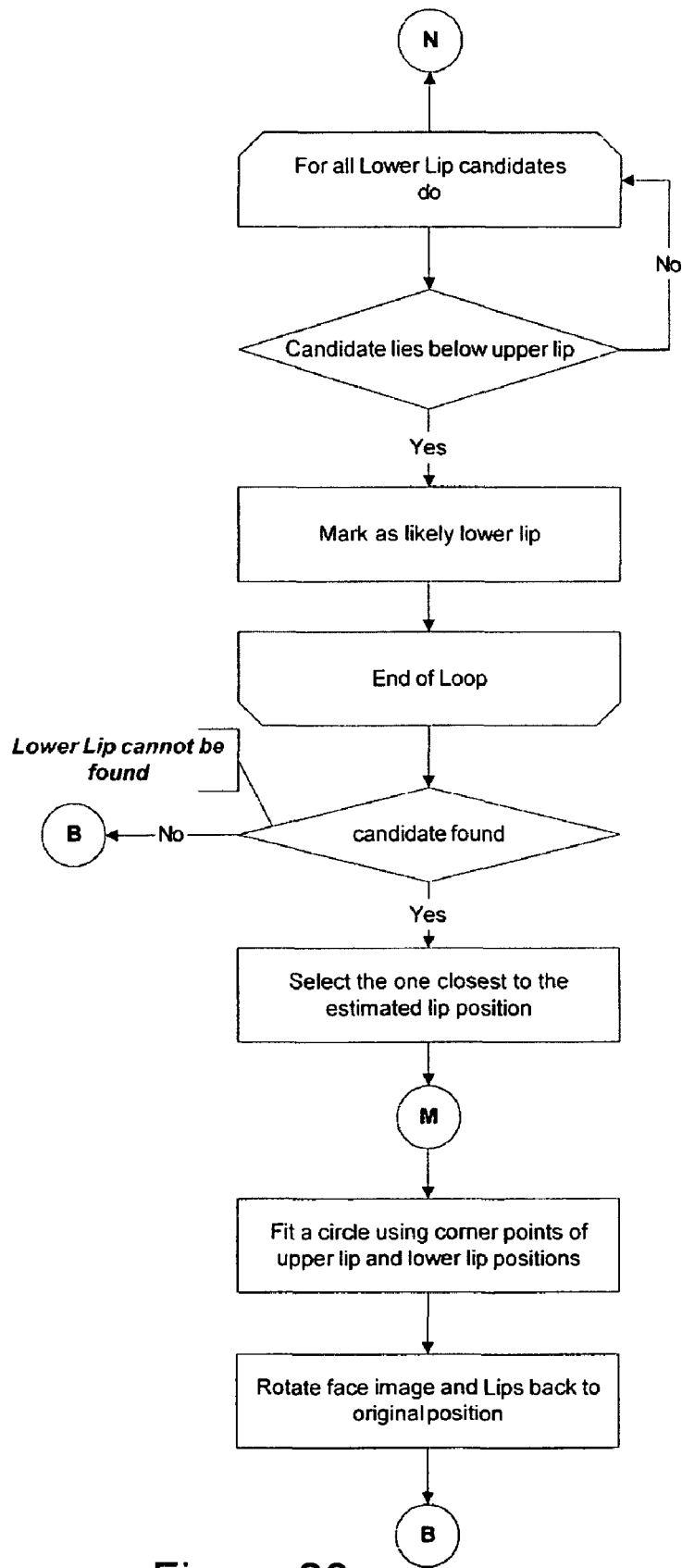

FIG. 20 is a portion of the flow chart for going to the next frame.

The total sequence illustrated in FIGS. 7 through 20 is one example of how visual Muevs are detected and characterized for correlation with audio Muevs.

Program Product

The invention may be implemented, for example, by having the mutual event detection and synchronization as a software application (as an operating system element), a dedicated processor, or a dedicated processor with dedicated code. The software executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for detecting video and audio mutual events, determining the delay, and applying a synchronization delay to the audio and video.

This signal-bearing medium may comprise, for example, memory in server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method of producing time synchronized multi-media signals comprising inputting a GPI Start pulse, a GPI Stop pulse and a Tally line for each video input, generating a Timer On/Off signal and a Time Value signal for each set of GPI Start pulse, GPI Stop pulse and Tally, providing the Timer On/Off signal and a Time Value signals to a router, and routing the signals as delay steering pulses to an audio synchronizer.

2. The method of claim 1 comprising selecting a delay time for each latch.

3. The method of claim 2 wherein the delay time is user selectable.

4. The method of claim 1 comprising:
   a. providing video inputs to a video switcher to provide video output and delay steering pulses;
   b. providing audio inputs and the delay steering inputs to an audio delay; and
   c. providing input from the audio delay to an audio mixer to provide corrected audio output.

5. The method of claim 1 comprising:
   a. providing video inputs to a video switcher to provide video output and delay steering pulses to an audio delay;
   b. providing audio inputs to an audio mixer; and
   c. providing input from the audio mixer to the audio delay to provide corrected audio output.

6. A system for producing time synchronized multi-media signals comprising:
   a). a video switcher having internal DVEs for receiving GPI Start pulses, GPI Stop pulses and Tally lines for each video input, generating a Timer On/Off signal and a Time Value signal for each set of GPI Start pulse, GPI Stop pulse and Tally,
   b). a router for receiving the Timer On/Off signal and a Time Value signals and routing delay signal pulses; and
   c). an audio synchronizer receiving the delay signal pulses and outputting audio signals synchronized to the video output signals.

7. The system of claim 6 further comprising means for selecting a delay time for each latch.

8. The system of claim 7 wherein the delay time is user selectable.

9. The system of claim 6 comprising:
 a. a video switcher for receiving video inputs and outputting video outputs and delay steering pulses;
 b. audio delay means receiving audio inputs and the delay steering inputs; and
 c. an audio mixer receiving inputs from the audio delay, said audio delay outputting corrected audio output.

10. The system of claim 6 comprising:
 a. a video switcher for receiving video inputs and outputting video outputs and delay steering pulses;
 b. audio mixer means receiving audio inputs and the delay steering inputs; and
 c. audio delay means receiving input from the audio mixer means and outputting corrected audio output.

11. A program product comprising a non-transitory storage medium carrying program code for producing time synchronized multi-media signals by a method comprising inputting a GPI Start pulse, a GPI Stop pulse and a Tally line for each video input, generating a Timer On/Off signal and a Time Value signal for each set of GPI Start pulse, GPI Stop pulse and Tally, providing the Timer On/Off signal and a Time Value signals to a router, and routing the signals as delay steering pulses to an audio synchronizer.

12. The method of claim 11 comprising selecting a delay time for each latch.

13. The program product of claim 12 wherein the delay time is user selectable.

14. The program product of claim 11 wherein the method comprises:
 a. providing video inputs to a video switcher to provide video output and delay steering pulses;
 b. providing audio inputs and the delay steering inputs to an audio delay; and
 c. providing input from the audio delay to an audio mixer to provide corrected audio output.

15. The program product of claim 11 comprising:
 a. providing video inputs to a video switcher to provide video output and delay steering pulses to an audio delay;
 b. providing audio inputs to an audio mixer; and
 c. providing input from the audio mixer to the audio delay to provide corrected audio output.

* * * * *